US012601511B2

(12) United States Patent
Bitter

(10) Patent No.: US 12,601,511 B2
(45) Date of Patent: Apr. 14, 2026

(54) HEAT CONDUCTION SHEET AND METHOD OF MANUFACTURING SUCH A SHEET

(71) Applicant: Schmöle GmbH, Fröndenberg (DE)

(72) Inventor: Dieter Bitter, Finnentrop (DE)

(73) Assignee: SCHMÖLE GMBH, Fröndenberg (DE)

(*) Notice: Subject to any disclaimer, the term of this patent is extended or adjusted under 35 U.S.C. 154(b) by 406 days.

(21) Appl. No.: 18/102,270

(22) Filed: Jan. 27, 2023

(65) Prior Publication Data

US 2023/0250977 A1 Aug. 10, 2023

(30) Foreign Application Priority Data

Jan. 27, 2022 (DE) ..................... 10 2022 101 897.0
Jan. 27, 2023 (DE) ..................... 10 2023 102 028.5

(51) Int. Cl.
*F24F 5/00* (2006.01)
*F16L 3/04* (2006.01)
*F28D 1/02* (2006.01)

(52) U.S. Cl.
CPC .............. *F24F 5/0092* (2013.01); *F16L 3/04* (2013.01); *F28D 2001/0293* (2013.01)

(58) Field of Classification Search
CPC ......... F24F 5/0092; F24F 5/0089; F16L 3/04; F28D 3/148; F28D 2001/0293
USPC ...................................... 165/185
See application file for complete search history.

(56) References Cited

U.S. PATENT DOCUMENTS 5,799,723 A * 9/1998 Sokolean .............. F24F 5/0089
165/53

FOREIGN PATENT DOCUMENTS

| CH | 305373 A | 2/1955 |
| DE | 102017130081 A1 | 6/2019 |
| DE | 102019123117 A1 | 3/2021 |
| EP | 0764818 B1 | 5/2001 |
| EP | 3121520 A1 | 1/2017 |
| EP | 3121548 A1 | 1/2017 |
| EP | 3786532 A1 | 3/2021 |
| KR | 100523690 B1 | 10/2005 |

OTHER PUBLICATIONS

Excerpt of German office action of Sep. 26, 2022 in Application DE 102022101897.0, 1 page.
Excerpt of European Search Report dated Jun. 16, 2023 in Application EP 23153707, 1 page.

* cited by examiner

*Primary Examiner* — Jon T. Schermerhorn, Jr.
(74) *Attorney, Agent, or Firm* — LUCAS & MERCANTI, LLP; Klaus P. Stoffel

(57) ABSTRACT

A heat-conducting plate for fixing a pipe section to a holding surface of a heat exchanger, wherein the heat-conducting plate has perforations, in particular for acoustic reasons, wherein the perforations are not distributed uniformly over the entire surface of the heat-conducting plate.

19 Claims, 8 Drawing Sheets

14

25

26

25

14

B

23

26

24

14'

α

β

23

24

Fig. 8a
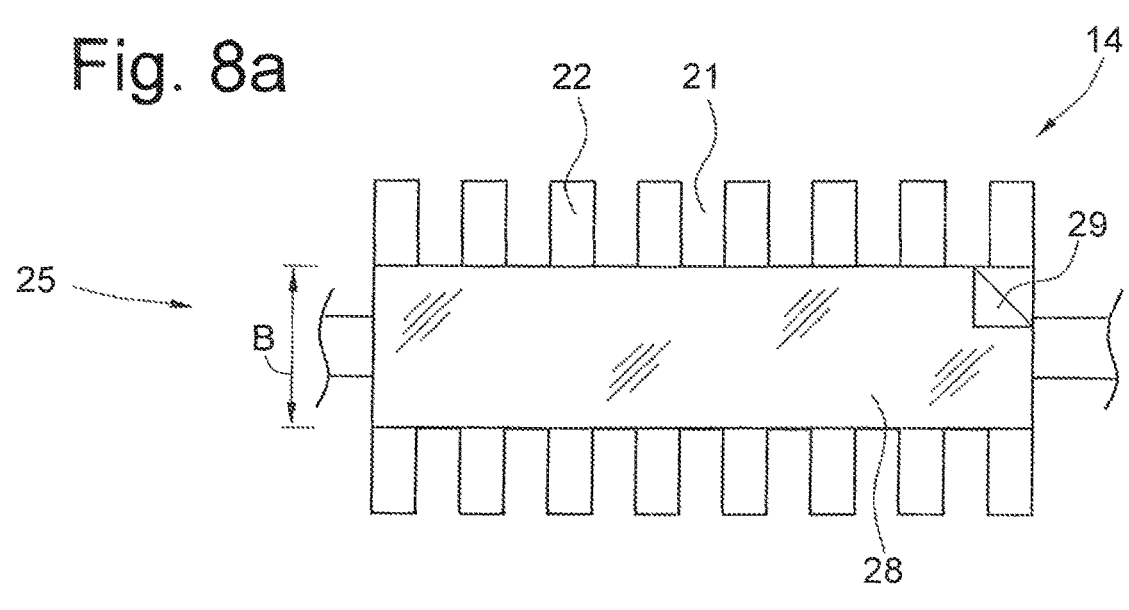
Fig. 8b
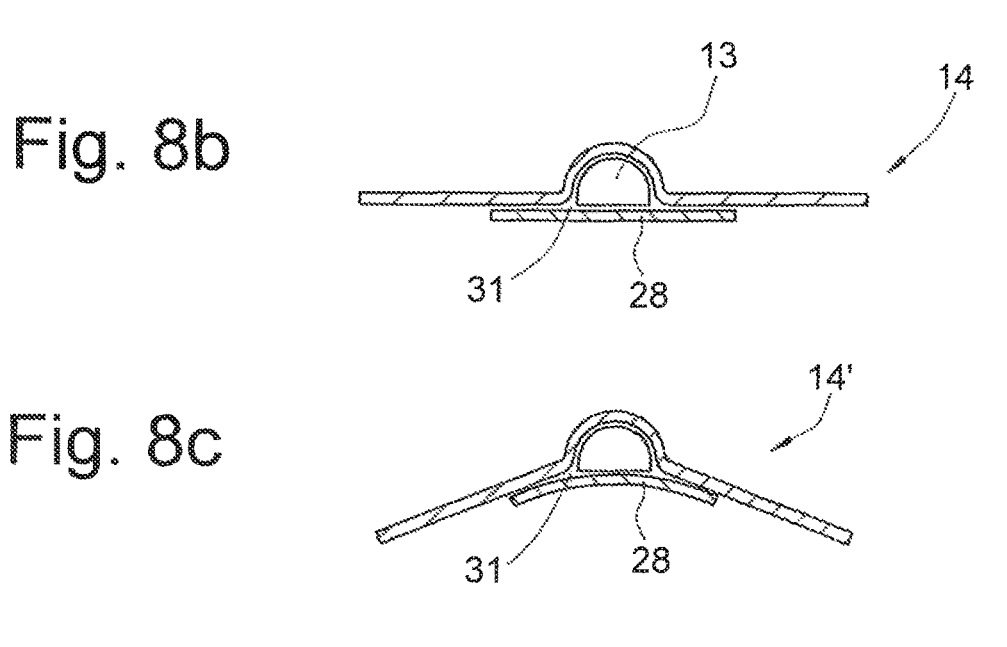
Fig. 8c
Fig. 9
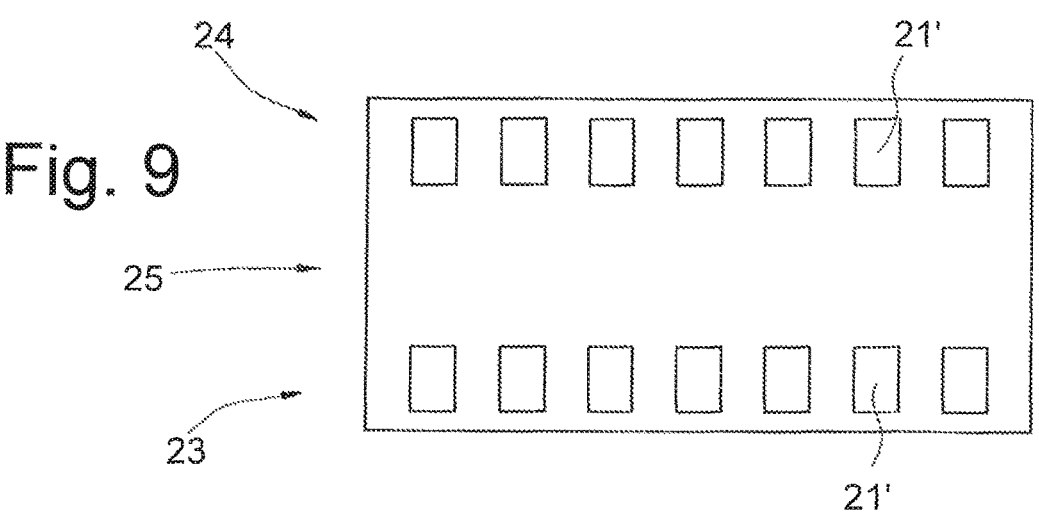

HEAT CONDUCTION SHEET AND METHOD OF MANUFACTURING SUCH A SHEET

CROSS-REFERENCE TO RELATED APPLICATIONS

The present application claims priority of DE 10 2022 101 897.0, filed Jan. 27, 2022, and DE 10 2023 102 028.5, filed Jan. 27, 2023, the priority of this application is hereby claimed and this application is incorporated herein by reference.

BACKGROUND OF THE INVENTION

The present invention relates to heat-conducting plates/ sheets for fixing a pipe section to a holding surface of a heat exchanger, in particular a surface heat exchanger.

Surface heat exchangers are typically used for air conditioning rooms. These have a holding surface and a pipe system arranged thereon, which conducts a heated or cooled medium along the holding surface. The pipe system is fixed to the holding surface with the help of a heat-conducting plate, which can overlap the pipe system, for example.

The holding surface can be provided, for example, by an end face of a holding cassette or, alternatively, by a carrier plate inserted into a holding cassette.

Although such a surface heat exchanger is used in particular to regulate the temperature of a room, there are also demands on it from an acoustic point of view—it is well known that corresponding holding cassettes are provided with (acoustic) perforations. This enables an optimized acoustic effect of the surface heat exchanger, as, for example, sound waves can partially enter it and thus at least be partially absorbed.

If a carrier plate is provided in the holding cassette, it is typically perforated congruently.

In order to improve the acoustic properties of such a heat exchanger, it is known from unpublished prior art to also perforate the heat-conducting plate or to provide it with perforations.

This means that the sound waves entering the holding cassette are not necessarily reflected back in the region of the heat-conducting plate, but are at least partially absorbed.

While the acoustic properties of a corresponding heat exchanger can thus indeed be improved, the heat conduction properties of the entire heat exchanger typically suffer as a result.

SUMMARY OF THE INVENTION

The object of the invention is therefore to provide a heat-conducting plate for a heat exchanger that enables optimized acoustic properties of a heat exchanger without a significant deterioration of the heat conduction properties.

The present invention achieves this object in that the perforations are not evenly distributed over the entire surface of the heat-conducting plate.

In other words, the idea of this first aspect is that perforations are arranged in the peripheral region of the heat-conducting plate (with respect to the longitudinal axis aligned along the cooperating pipe section), or that the perforations are concentrated in the lateral regions of the heat-conducting plate, in particular occupying a greater proportion in terms of number and/or area than in a central section of the heat-conducting plate of the same size.

According to the invention, the perforations are not evenly distributed over the entire surface of the heat-conducting plate, which means in particular that there are regions in which there are more perforations and/or larger perforations than in other regions. For example, acoustic perforations for holding cassettes of heat exchangers are usually evenly distributed over the entire surface thereof. They thus form a homogeneous, even grid that does not change over the entire surface of the holding cassette.

However, the perforations according to the invention enable better basic heat conduction due to their uneven arrangement:

For example, no perforations or fewer (or smaller) perforations compared to the other regions can be provided in regions where the heat-conducting plate is in contact with the pipe section, as perforations in this area, in an acoustic sense, are of no or little use anyway. Thus, the pipe sections are not perforated because they have to conduct a heat medium, and it is therefore not advantageous to provide a normal perforation configuration of the heat-conducting plate in the regions where these pipe sections are in contact with the heat-conducting plate. In other words, these perforations would be disabled by the pipe section anyway.

However, if the heat-conducting plate has fewer or smaller perforations or no perforations at all in this region, the heat conduction properties of the entire heat exchanger increase, wherein the temperature difference transferred in the contact area between the heat-conducting plate and the pipe section can be passed on better (to the holding surface).

A non-uniform arrangement of the perforations can consist in particular in the fact that the perforations are essentially or exclusively assigned to the edge regions of the heat-conducting plate, while no or hardly any perforations are assigned to the central section. The central section may in particular be the region that contacts and/or interacts with the pipe section. Thus, said side sections of the heat-conducting plate can be located laterally to the longitudinal axis of the pipe section.

Perforations (which together form a perforation) are understood in this context to mean in particular through-holes in flat objects, in particular sheet metal plates. Accordingly, an acoustic perforation (for example of a heat-conducting plate) is in this sense a perforation and consists of perforations.

The through-holes can be completely enclosed by the material of the body or sheet metal plates and/or be designed as edge recesses open to the outside.

The perforations are therefore enclosed or outwardly open openings in the material of the heat-conducting plate. Outwardly open edge recesses or openings thus recede in particular behind the outer contour of a blank of the heat-conducting plate, which outer contour is typically formed by straight lines.

The perforations can have any suitable shape; for example, rectangular or round.

The perforations can preferably all have the same shape or alternatively have different shapes.

In particular, the perforations are worked out of a heat-conducting plate of the blank in a separation process.

In principle, a chip-removing process can be selected, or alternatively a chipless process can be selected.

Advantageously, several heat-conducting plates can be machined out of one blank without cutting (for example, if adjacent heat-conducting plates have interlocking teeth or similar).

However, there are also other design options for a chipless method:

in particular, the perforations can be designed to preserve material in the sense that material is deflected out of the sheet metal plane, but basically remains on the sheet metal plate (for example, in the sense of flap or rasp perforations or louvre perforations, i.e. holes in which material is pressed through the (torn) sheet metal plane to achieve an opening, but is not cut off).

In this sense, a method has proven to be particularly advantageous in which (side) incisions are made to work out the perforations, so that several tongues lying next to one another are created. Some of these tongues, in particular every second one of these tongues, can then be raised (for example, bent or beveled or the like).

This is also a chipless method.

Typically, the perforations are punched or nibbled out of the material.

According to the invention, the perforations should not be evenly distributed over the entire surface of the heat-conducting plate, wherein in this sense the surface of a heat-conducting plate means in particular the region within the outer contour of a conventional heat-conducting plate or a corresponding blank. This entire surface is typically rectangular in shape.

The perforations can, for example, be basically symmetrically arranged but still "not evenly" distributed over the entire surface of the heat-conducting plate. For example, the perforations can only be provided in one or more edge regions (but regularly or evenly there), so that they are not evenly distributed over the "entire" surface of the heat-conducting plate.

The heat-conducting plate is preferably made of aluminum or aluminum alloy(s), in particular not soft aluminum.

However, the heat-conducting plate can also be made of any other suitable material, typically metal.

As its name suggests, the heat-conducting plate is made from a sheet metal plate, i.e. a rolled metal product that is (initially) designed as a sheet.

In particular, it can be a thin sheet metal plate with a thickness of less than 3 mm.

Alternatively, it can be a medium sheet metal plate with a thickness of between 3 mm and 4.75 mm.

Alternatively, it can also be a heavy sheet metal plate with a thickness of somewhat more than 4.75 mm.

Preferably, therefore, the sheet metal plate has a thickness of less than 5 mm, more preferably less than 3.5 mm, more preferably less than 3 mm.

According to a particularly advantageous embodiment of the invention, the (heat-conducting) plate is painted, in particular on both sides.

The painting can, for example, be involve strip painting or a sprayed surface.

A painted (or sprayed) surface promotes the heat radiation properties of the heat-conducting plate.

Painting on both sides can be particularly advantageous in this sense if the heat-conducting plate comprises raised fingers or intermediate fingers arranged above edge recesses, as these are also improved in this way from their raised underside with regard to their heat radiation properties.

A heat-conducting plate according to the invention is in particular used to fix a pipe section to a holding surface of a heat exchanger.

The pipe section can be in direct or indirect contact with the holding surface.

In particular, the holding surface can, for example, be associated with a fleece arranged between the pipe section and the holding surface.

Such a fleece is fixed to the holding surface in a non-detachable manner—for example, with the help of (hot-melt) adhesive.

Such a fleece can also be called "acoustic fleece". This is a fabric or similar material that can further improve the acoustic properties of the heat exchanger.

Although an (acoustic) fleece typically covers the acoustic perforation of the holding surface, this has no negative influence on the acoustic properties of the heat exchanger (but rather positive properties, in particular with regard to the absorptions above the holding surface).

If the heat exchanger has a corresponding fleece, the combination of heat-conducting plate and pipe section can preferably be fixed to the holding surface (i.e. indirectly via the fleece) with the help of a viscous or liquid adhesive. In this case, there is namely the advantage that the adhesive can enter the fleece and, on the one hand, improve the bond between the fleece and the holding surface and/or, on the other hand, improve the heat conduction properties of the fleece (in particular since the cavities in the fleece are filled).

Preferably, the heat-conducting plate can overlap the pipe section relative to the holding surface.

In other words, the pipe section between the holding surface and the heat-conducting plate is "sandwiched".

However, differently configured heat-conducting plates are also covered by the invention in principle: For example, there are heat-conducting plates that are placed between the pipe section and the holding surface. For example, the pipe section can be fixed, in particular welded, to one side of the heat-conducting plate, and the heat-conducting plate is attached to the holding surface with its other side. Such heat-conducting plates are also covered by the invention in principle.

The heat-conducting plates typically have two side sections or wing sections with which they contact the holding surface, while a central section overlaps the pipe section. Of course, heat-conducting plates are also known in which only such a side section or wing section is present and the pipe section can be clipped into the side of the heat-conducting plate. Such configurations are also intended to be covered by the invention.

The holding surface may be, for example, the inner face or main surface of a holding cassette, or a surface provided by a first side of a carrier plate, wherein the carrier plate is subsequently installed as a heat exchanger or for the manufacture of a heat exchanger. For example, the carrier plate can be placed in a holding cassette or mounted on a ceiling or wall or similar. A fleece can be arranged on said surface of the holding cassette and/or on the carrier plate, if necessary—depending on requirements.

Such a heat exchanger is in particular a surface heat exchanger. Such a surface heat exchanger can in particular be assigned to the ceiling or floor region of a room in order to air-condition it.

The pipe sections defined by the heat-conducting plate can be made in particular of copper or another suitable metal, such as stainless steel, aluminum, titanium or the like.

They may have a suitable cross-section; for example, a D-shaped cross-section typical of the applicant, or a round or angular cross-section.

The pipe sections can in particular be part of a pipe meander or another type of pipe body such as a 'pipe harp'.

The pipe sections overlapped by the heat-conducting plate are usually straight.

The heat-conducting plate therefore typically also has an essentially rectangular enveloping contour when viewed from above (the perforations may recede behind this enveloping contour).

According to a particularly advantageous embodiment of the invention, the heat-conducting plate has a central section and at least one side section.

As already explained above, the central section essentially extends over the region of the heat-conducting plate that interacts with the pipe section, in particular overlaps and/or contacts it.

In particular, the central section can be provided with a bead so that the pipe section can be overlapped positively or approximately positively or can rest against or be pressed against or overlapped by the heat-conducting plate.

The bead preferably has a rounded cross-sectional shape and the pipe section is typically also rounded in the region where it interacts with the heat-conducting plate (in the case of a D-shape of the pipe section, the flat side can then rest on the holding surface).

In relation to the longitudinal axis of the pipe section (and thus also of the entire heat-conducting plate), the side section can be arranged in particular next to or parallel to the pipe section. It can therefore be an edge section of the heat-conducting plate.

Typically, a heat-conducting plate has two side sections— one on each side of the central section (or pipe section).

The side sections can therefore also be called wings.

However, configurations with only one side section are also conceivable; for example, the variant already mentioned above, in which the pipe section can be clipped into the side of the heat-conducting plate.

While the central section is used in particular to overlap the pipe section or at least contacts it in order to fix it to the holding surface, the side sections are used in particular to enable good heat transfer between the heat-conducting plate and the holding surface. For this purpose, the side sections lie against the holding surface in particular in the assembled state.

According to the most preferred embodiment of the invention, it is envisaged that the side section(s) (if there are two, which is probably the case in the majority of cases) have more perforations per surface unit than the central section. In this sense, at least one of the side sections (preferably both) should have more perforations per surface unit than the central section.

The idea underlying this design is that the central section is typically associated with the pipe section, which by its very nature must be soundproof. Placing holes or perforations in this area therefore makes little sense and the applicant has come to the idea of providing more perforations in the side section than in the central section.

In other words, the side section can be described by a reference such as "m perforations/cm$^2$", wherein the central section has "n perforations/cm$^2$", where m>n.

Alternatively, it can be provided that the side section may have a perforated surface per surface unit that is larger than the perforated surface of the central section per (identical) surface unit.

According to a particularly advantageous embodiment, the perforations are essentially formed in the side region(s). Here, essentially means that the majority of the perforations are in the side region(s). In particular, the perforations are located entirely in the side region(s). Thus, the latter special case means that the central section has no perforations.

Preferably, the perforations are arranged within an enveloping contour of the heat-conducting plate. This should clarify that, for example, edge recesses open to the outside are also to be understood as perforations.

The enveloping contour of the heat-conducting plate is typically formed by straight lines that limit the transverse extension of the heat-conducting plate.

Accordingly, a particular embodiment of the invention is also that the perforations are at least partially formed as outwardly open edge recesses.

"At least partially" in this context means that at least a part of the perforations is formed as outwardly open edge recesses, wherein the remainder may be formed as openings enclosed by the heat-conducting plate material.

In a particularly preferred embodiment, all perforations are formed as outwardly open edge recesses.

These can in particular have a rectangular cross-section and/or form (preferably rectangular) tongues between them.

According to a particularly advantageous design of the invention, the heat-conducting plate has two side sections, which at least in the unbuilt state, are arranged at an incidence angle to one another.

In a conventional design, the side sections typically lie in one plane so that no incidence angle is formed between them. However, according to a preferred form, an incidence angle is provided, in particular in the range of between 0 and 90°.

In particular, the adjustment direction can be selected in such a way that the opening angle to the bead located between the side sections is reduced to less than 180°.

In other words, the side sections are deformed towards the later assembly direction.

This design allows a certain amount of pre-tensioning of the side sections towards the holding surface during subsequent assembly on a holding surface. This embodiment allows the side sections to rest securely against the side surface, thus preventing the side sections from inadvertently protruding from the holding surface, which could otherwise lead to a loss of performance of the heat exchanger.

According to a particularly advantageous embodiment of the invention, the heat-conducting plate has holding means for attachment to the holding surface.

Depending on the design, these holding means can be considered part of the heat-conducting plate and/or part of the heat exchanger.

The retaining means at least ensure that the heat-conducting plate (and pipe section) are securely fixed to the holding surface of the heat exchanger.

For example, the holding means may be adhesives so that the heat-conducting plate is stuck to the holding surface as a whole.

Double-sided adhesive tape has proven to be particularly suitable for this purpose. This can be attached to the heat-conducting plate (in particular together with the pipe section), namely with a first adhesive side. The opposite side of the double-sided adhesive tape can then be covered by a protective layer; for example, a protective film.

Provided that this protective layer is not removed, the heat-conducting plate (in particular together with the pipe section or pipe system already arranged thereon) can thus be stored and/or transported without the risk of the stored or transported heat-conducting plate (and pipe system) unit sticking together unintentionally.

The structural unit can thus be brought to an assembly location and activated there; for example, by peeling off the protective layer, after which it can be glued, for example, into a holding cassette or onto a carrier plate or the like.

Instead of adhesive, any other suitable holding system can of course be used as holding means; for example, it is conceivable that the heat-conducting plate is magnetically arranged on the holding surface of the heat exchanger. The holding means may thus comprise magnets and/or the heat-conducting plate may be partially magnetic or the like.

In principle, however, it would also be possible to dispense with holding means. For example, a heat-conducting plate can be (subsequently) stuck to a holding surface with separate adhesive or welded to a holding surface or otherwise fastened.

If an adhesive is used, an adhesive bead in particular can be applied manually or mechanically, in particular in the region of the tube section and/or the central section of the heat-conducting plate.

Such a bead of a viscous (to liquid) adhesive has the advantage that it can enter into a possibly existing fleece. Alternatively or additionally, the adhesive in this case can also enter any cavities that may exist in the region between the pipe section and the heat-conducting plate and thus improve the heat conduction properties of the heat exchanger.

According to a particularly advantageous embodiment of the invention, the holding means—as far as they are provided—are in particular arranged exclusively in a region of the heat-conducting plate in which no perforations are provided. In particular, this can be the central section, which interacts with the pipe section.

This allows for a particularly good acoustic property of the heat-conducting plate, as no perforations are rendered inactive by the holding means.

Alternatively, the holding means can also be assigned exclusively to the central section, regardless of whether this has perforations or not.

According to the most preferred embodiment of the invention, the perforations are formed as outwardly open edge recesses, forming fingers of the heat-conducting plate, wherein intermediate fingers of the heat-conducting plate are arranged above the recesses.

These fingers preferably have the shape of the recesses.

The intermediate fingers are typically arranged between the fingers (as the name implies), which means that they are arranged in between the fingers, in particular in a top view or a bottom view of the heat-conducting plate, and form an alternating sequence with the fingers.

In particular, they may be raised intermediate fingers.

These raised intermediate fingers can therefore be raised from the sheet metal plane by bending or folding (wherein bending is intended to be a generic term for folding in the sense of the invention).

For this purpose, the heat-conducting plate or the blank can preferably first be cut into laterally. This creates fingers arranged next to one another, which can alternately either remain in the plane or be raised (the fingers remaining in the plane can then also be raised in the opposite direction, as described above, for the purpose of biasing them onto a holding surface).

In this way, too, outwardly open edge recesses are thus created, wherein the raised intermediate fingers can obviously enable improved thermal properties of the entire heat-conducting plate or the entire heat exchanger, in particular with equally good or approximately equally good acoustic properties.

This may have to do in particular with the fact that turbulence occurs with supplied air due to the intermediate fingers, which can cause or optimize convection effects in particular.

The intermediate fingers can preferably occur as pairs, so that in the axial direction of the heat-conducting plate, two fingers are not raised laterally (in order to later lie against the holding surface) and two (intermediate) fingers are raised (in order to form the lateral perforation and enable convection effects).

Purely for the sake of completeness, it is pointed out that other, non-axis-symmetrical configurations of the intermediate fingers and fingers are of course possible.

According to the most preferred embodiment of the invention, the intermediate fingers protrude at an elevation angle from the main extension plane of the heat-conducting plate and/or the holding surface and/or the fingers.

In particular, it can be provided that the fingers are arranged in the main extension plane of the heat-conducting plate and/or parallel to the holding surface.

It should be noted here that the main extension plane of the heat-conducting plate is typically the sheet metal blank plane of the heat-conducting plate. Typically, the (non-raised) fingers lie in the main extension plane, unless they are biased as described above (against the raising direction) to allow secure attachment to the holding surface.

The elevation angle of the intermediate fingers is typically between 1° and 180°, preferably between 25° and 100°.

In the most preferred embodiment, the elevation angle is between 70° and 90°, in particular approximately 80°.

The elevation angles on both sides of the heat-conducting plate bead are typically identical, but arranged mirror-symmetrically in reverse (of course, other embodiments are also covered by the invention, in which the elevation angles differ within the heat-conducting plate).

It is preferable to have a socket in which all the elevation angles of the heat-conducting plate are identical.

According to an alternative embodiment, however, the intermediate fingers can also protrude at different elevation angles. In particular, this may apply to intermediate fingers on a common side of the heat-conducting plate.

In this way, deliberate swirls or turbulence can occur, in particular with supply air fed in above the heat exchanger plane, which can promote convection effects.

In particular, the fingers and intermediate fingers are arranged alternately.

Accordingly, each (non-raised) finger can be followed by an intermediate (raised) finger and then by another (non-raised) finger.

This alternating arrangement can be provided continuously, in particular on both sides of the heat-conducting plate.

According to a further advantageous embodiment, it can be provided that the intermediate fingers are twisted in themselves.

In this sense, the intermediate fingers are not only raised, but also twisted by (rotational) forces.

Such a design can also improve the turbulence of air supplied above the heat exchanger or heat-conducting plate and promote turbulence. In this sense, laminar disturbances are rather undesirable in such heat exchangers, which are counteracted by twisting.

According to a further aspect of the invention, the provided object is achieved by a heat exchanger according to claim 12. This has a heat-conducting plate according to the invention, which fixes a pipe section to a holding surface of the heat exchanger.

The heat exchanger can in particular be a surface heat exchanger, i.e. a heat exchanger that typically spans large regions in rooms. Such heat exchangers can, for example, be assigned to the ceiling or the floor region or the wall region of a room or an outdoor terrace or wall or similar and are intended to be used for heat regulation.

In particular, a cooling or heating medium can be passed through the pipe sections so that the heat exchanger as a whole produces cooling or heating effects.

For the sake of completeness, it is pointed out that all the embodiments and advantages described in connection with the heat-conducting plate according to the invention are also intended to be transferable to the heat exchanger according to the invention and vice versa.

In particular, the heat-conducting plate in the heat exchanger according to the invention can thus overlap a pipe section (and sandwich this between itself and the holding surface) and/or the perforations are formed as outwardly open edge recesses, wherein intermediate fingers of the heat-conducting plate are arranged above the recesses in particular.

This statement also applies in particular in connection with a method according to the invention. All the above advantages and embodiments are thus also intended to be transferable to the method according to the invention and vice versa.

The method according to the invention is characterized in particular in that outwardly open edge recesses are formed on a heat-conducting plate. Tongues in particular can arise here. The edge recesses represent perforations.

The perforations in the manner of outwardly open edge recesses can in particular be punched out or nibbled out.

This can be done, for example, starting from a sheet metal blank.

In a further method step, a bead can preferably be introduced into the heat-conducting plate afterwards (alternatively beforehand). The bead is typically created by an embossing process. Alternatively, any other suitable method can be chosen, such as roller burnishing or similar. Embossing a bead, however, has proven to be particularly advantageous.

In particular, the method may comprise a step according to which side cuts are provided in the heat-conducting plate and subsequently some of the resulting fingers are bent (upwards), preferably alternately (every second).

In this sense, it is particularly preferable that the method steps of cutting the heat-conducting plate and raising the (intermediate) fingers are carried out in a single work step.

According to the invention, a special combination tool can be used for this purpose, which cuts and raises the resulting fingers in a single step.

Additionally or alternatively, two side sections of the heat-conducting plate can be formed at an incidence angle to one another. The side sections can therefore be shaped accordingly, for example bent, or similar. Here reference is made in particular to the explanations on the incidence angle above.

BRIEF DESCRIPTION OF THE DRAWING

Further advantages of the invention result from the are apparent from the sub-claims not mentioned and from the following description of the exemplary embodiments shown in the figures. In the figures:

FIG. 8a shows the device according to FIG. 7a with double-sided adhesive tape applied, FIG. 8b shows the device according to FIG. 7b with double-sided adhesive tape applied, FIG. 8c shows a view according to FIG. 8b of an alternative, slightly modified heat-conducting plate with pre-tensioned side regions, FIG. 9 shows a view according to FIG. 5a of an alternative design of perforations, which in this exemplary embodiment are not formed as outwardly open edge recesses, but as closed edge recesses.

Figure 1:
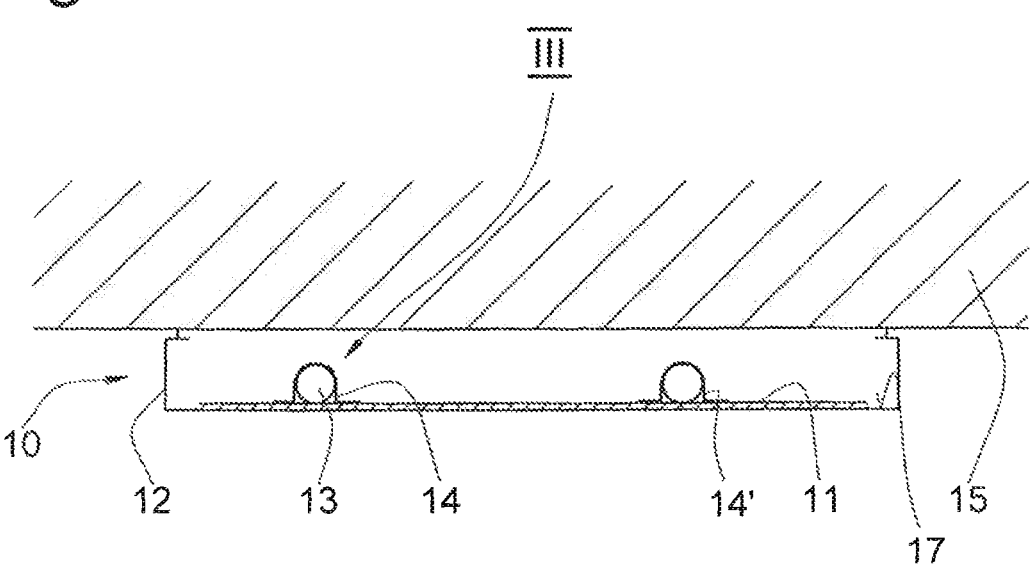
FIG. 1 shows a highly schematic sectional view of a surface heat exchanger according to the invention arranged on a building ceiling, with an exemplary view of two heat-conducting plates according to the invention.

DETAILED DESCRIPTION OF THE
INVENTION

Exemplary embodiments of the invention are described in the following figure description, additionally with reference to the drawings. For the sake of clarity—also as far as different embodiments are concerned—identical or comparable parts or elements or regions are designated with the same reference numerals, sometimes with the addition of lowercase letters, numbers and/or apostrophes. The same applies to the claims following the figure description.

Features described only in relation to one embodiment may also be provided in any other embodiment of the invention within the scope of the invention. Such modified embodiments—even if not shown in the drawings—are covered by the invention.

All disclosed features are essential to the invention in themselves. The disclosure of the application hereby also includes in full the disclosure content of any associated priority documents (copy of the prior application) as well as any cited publications and the described prior art devices, also for the purpose of including individual or several features of these documents in one or several claims of the present application.

FIG. 1 first shows an example of a (surface) heat exchanger 10 of the cassette type according to the invention. In the embodiment shown, a carrier plate 11 is inserted into a cassette 12, which in turn is arranged on a room ceiling 15. The carrier plate 11 is stuck to the inside of the cassette on its underside and lies approximately centrally. A pipe system with pipe sections 13 is arranged on the carrier plate 11 and fastened with the aid of, in particular strip-like, heat-conducting plates 14 or 14' according to the invention.

In the exemplary embodiment shown, the strip-like heat-conducting plate 14, 14' overlaps the pipe 13 and is firmly arranged, in particular stuck, to the carrier plate 11 via holding means (not shown).

For the sake of completeness, it should be noted that configurations exist with or without the carrier plate 11. Alternatively, the pipe system 13 and the heat-conducting plates 14, 14' could also be stuck directly to the inside 17 of the end face of the cassette 12. Both configurations are covered by the invention.

Figure 2:
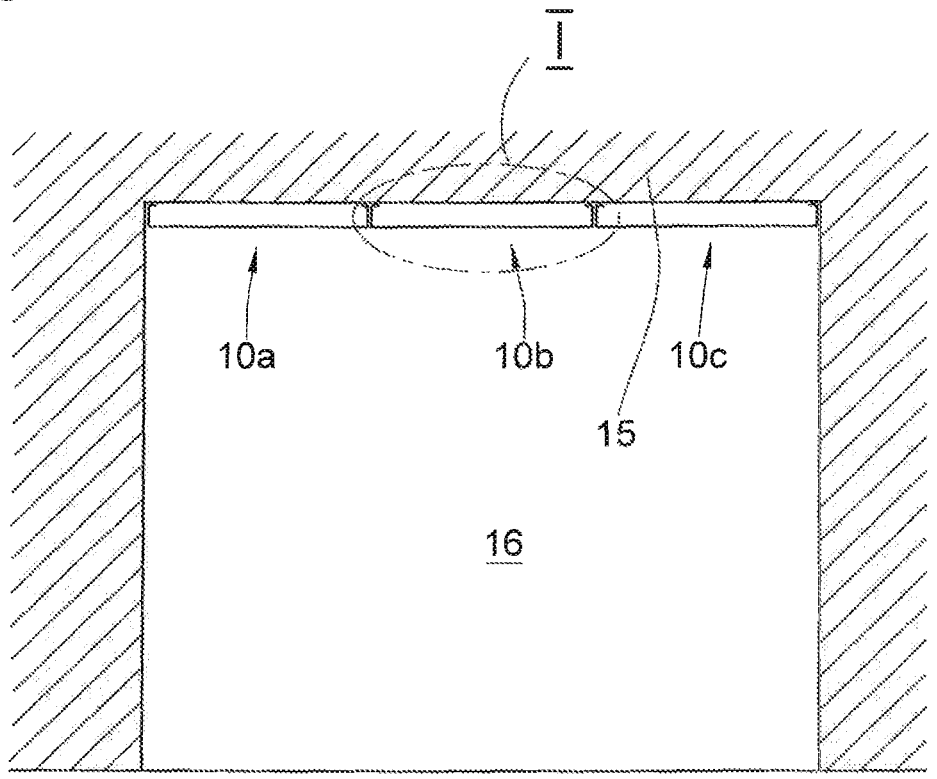
FIG. 2 shows a schematic sectional view, omitting essential elements, of the arrangement of three surface heat exchangers according to the invention in one room.

As shown in FIG. 2, several surface heat exchangers 10 according to the invention can be mounted, for example, in the region of the ceiling 15 of a building room 16 in order to air-condition the room 16 on the ceiling side. The air conditioning can in particular serve to heat or alternatively cool the room 16. In particular, for optical reasons, surface heat exchangers of the cassette type are often used for such requirements, in which the actual functional components of the surface heat exchanger 10, such as the heat-conducting plate or pipe system, are arranged in a holding cassette 12.

FIG. 2 shows a surface heat exchanger system consisting of three surface heat exchangers 10a, 10b and 10c, the holding cassettes of which are arranged next to one another essentially in a cascade.

For reasons of clarity, for example, the pipe system is not shown in FIG. 2. However, the pipes of all three heat exchangers 10a, 10b, 10c can, for example, be assigned a common inflow and outflow.

Not visible in FIG. 1 as well as in FIG. 2 are acoustic perforations of the holding cassette(s) 10 or of the carrier plate 11 and in particular also perforations of the heat-conducting plates according to the invention. Although these could in principle be shown in cross-sectional views according to FIGS. 1 and 2, they would jeopardize the clarity of the figures, which is why they have been omitted from FIGS. 1 and 2, such that FIGS. 1 and 2 initially only serve to illustrate a basic arrangement of a heat exchanger or heat-conducting plates according to the invention.

Figure 3:
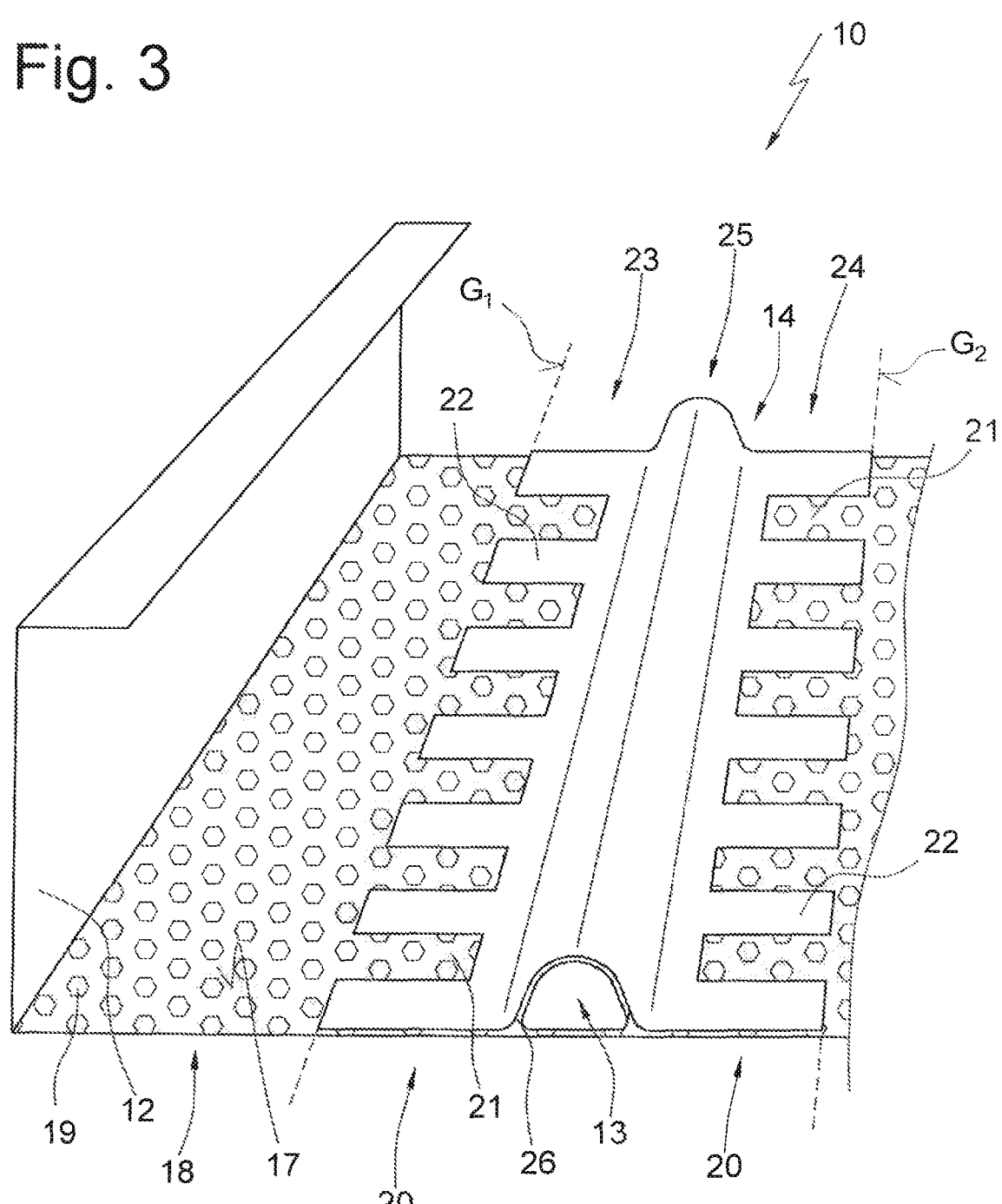
FIG. 3 shows a highly schematic, oblique perspective view of an inner edge region of a surface heat exchanger according to the invention, approximately according to view arrow III in FIG. 1, but omitting a carrier plate.

FIG. 3 then provides a more detailed description of the invention, in particular of the arrangement of the perforations in the heat-conducting plate according to the invention.

FIG. 3 shows here in a highly schematic, oblique isometric view a partial region of a heat exchanger 10 according to the invention, which partial region in FIG. 1 is provided with the view arrow III (in particular omitting the ceiling 15).

Only for reasons of disclosure, the heat exchanger 10 according to FIG. 3 has two differences to the one according to FIG. 1. These differences may or may not be optional in a heat-conducting plate or heat exchanger according to the invention. Therefore, the elements of the heat exchanger are provided with the same reference numerals in both figures.

Firstly, as shown in FIG. 3, the pipe system or the pipe section 13 has a D-shaped cross-section (in contrast to a round shape as shown in FIG. 1). Such a shape is typical in particular for pipes of the applicant, but the invention can also be used without further ado for other pipe cross-sections.

Secondly, the carrier plate 11 shown in FIG. 1 is not provided in FIG. 3. This means, therefore, that a heat-conducting plate 14 according to the invention can fix a pipe section 13 either directly to the inner side 17 of the cassette 12 or alternatively, as shown in FIG. 1, indirectly, namely via a carrier plate 11, for example, to which the pipe system 13 is then directly fixed by the heat-conducting plate 14. In other words, depending on the requirements, the heat-conducting plate 14 together with the pipe system or pipe section 13 can be stuck directly into the retaining cassette or (initially) onto a carrier plate 11, which is then inserted into (and fixed in) the cassette 12.

Viewing FIG. 3 shows that the holding cassette 12 has an acoustic perforation 18, which consists of numerous holes 19.

These serve to absorb sound through the cassette 12, in that the sound waves are not completely reflected back into the room at the bottom of the holding cassette, but can (partially) enter the cassette 12 through the holes 19.

However, FIG. 3 also illustrates that the holes 19 are at least partially covered by the heat-conducting plate 14 and thus "disabled".

A heat-conducting plate (both conventional and according to the invention) typically has an outer contour formed by two indicated straight lines G1, G2, such that the region between the two straight lines G1, G2 would be completely acoustically disabled when using a conventional heat-conducting plate.

However, as shown in FIG. 3, the heat-conducting plate 14 according to the invention now offers the special feature of having a perforation 20 with perforations 21.

These perforations are essentially rectangular in the exemplary embodiment according to FIG. 3 (merely exemplary), and in particular as outwardly open edge recesses 21.

The perforations 21 thus all lie within (and recede behind) the enveloping contour of the heat-conducting plate 14 formed by the straight lines G1 and G2.

Providing perforations 21 on the heat-conducting plate 14 also creates (edge) tongues 22 on the heat-conducting plate.

FIG. 3 now illustrates that although the acoustic perforation 18 is essentially disabled in the region of the tongues 22, it can remain enabled in the region of the perforations 21 located therebetween.

In this way, the acoustic properties of a heat exchanger 10 are significantly improved compared to a heat exchanger with a conventional heat-conducting plate design, without this being accompanied by a noticeable drop in the heat conduction properties, in particular as the tongues 22 ensure sufficient heat transfer from the pipe section 13 to the inside 17 of the cassette 12 (or to the carrier plate 11 in a configuration according to FIG. 1).

As FIG. 3 further illustrates, the perforations 21 (as well as the tongues 22) are essentially (in particular completely)

associated with side sections 23 and 24 of the heat-conducting plate 14, while the central section 25 is essentially (in particular continuously) designed without perforations.

However, the central section 25 is not flat, but has a bead 26 for receiving the pipe system or the pipe section 13.

Finally, it should be noted with regard to FIG. 3 that if a carrier plate 11 as shown in FIG. 1 were to be provided in this embodiment, this would typically also have an acoustic perforation, which could in particular be arranged (partially) congruently with the acoustic perforation 18 of the holding cassette 12.

Thus, the perforation 20 of the heat-conducting plate can also be described as an acoustic perforation.

Purely for reasons of better understanding, the present application refers to an acoustic perforation on the one hand (in relation to the holding cassette 12 or the carrier plate 11) and to a perforation 20 on the other hand in relation to the heat-conducting plate. However, this is not to say that these terms describe different hole shapes. Rather, instead of the rectangular edge recesses shown, the perforation could be formed completely in line with the acoustic perforation 18 of the holding cassette. Thus, no forms of holes or perforations are to be excluded from the invention.

Figure 4:
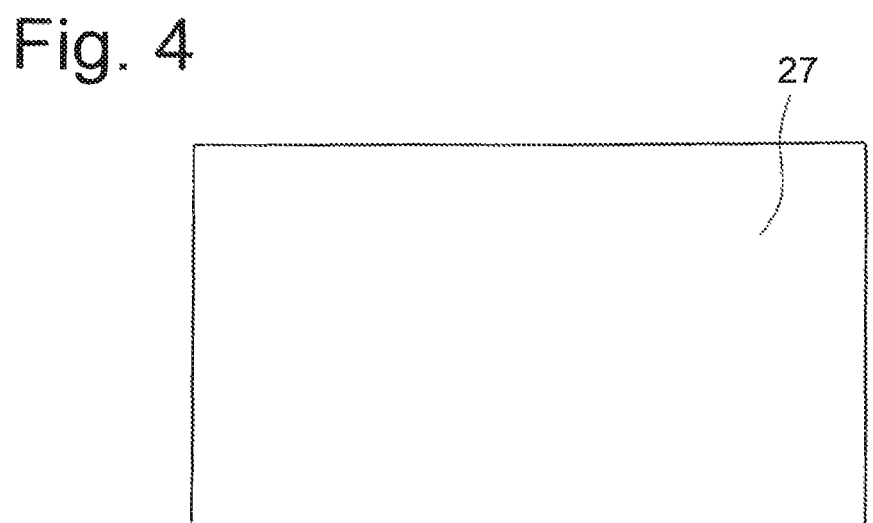
FIG. 4 shows a highly schematic view of a blank for producing a heat-conducting plate according to the invention.

The sequence of figures in FIGS. 4 to 8 is then intended to illustrate the manufacture of a heat-conducting plate 14 according to the invention or of a unit comprising a heat-conducting plate 14 and a pipe section 13:

FIG. 4 shows a highly schematic, planar view of a blank 27 in the form of a sheet metal plate. This sheet metal plate is preferably made of aluminum, in particular hard aluminum (in contrast to soft aluminum, which is often used for prior art heat-conducting plates).

Figure 5A:
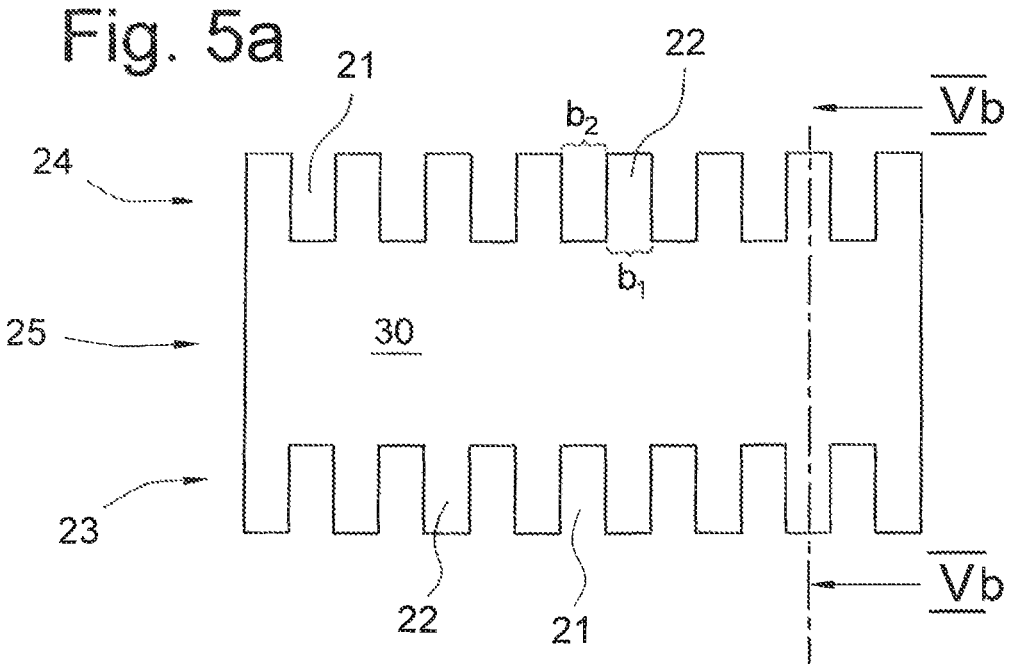
FIG. 5a shows a view somewhat according to FIG. 4 of a further processed blank, after the use of a nibbler to make a perforation on the edge or to form tongues on the edge.

In a first step, the basic shape of the heat-conducting plate 14 shown in FIG. 5a is worked out of this blank 27 by nibbling or punching the perforations 21 out of the blank 27, in particular with the aid of a nibbling machine. This creates the edge tongues 22 shown again in FIG. 5a.

Figure 5B:
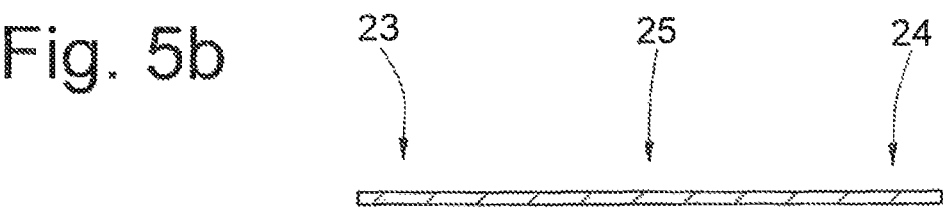
FIG. 5b shows a schematic sectional view, somewhat along the section line Vb-Vb, of the body shown in FIG. 5a, FIG. 6a shows a view according to FIG. 5a of the blank shown in FIG. 5a after carrying out an embossing process to insert a bead.

The cross-sectional view according to FIG. 5b shows that the heat-conducting plate is still flat in this state. In this respect, the blank according to FIG. 4 also has an identical cross-section according to FIG. 5b.

In addition, it should be noted with regard to FIGS. 4 and 5 that a blank 27 with an enveloping contour corresponding to the enveloping contour of the intermediate product according to FIG. 5a is provided here only for reasons of clarity in FIG. 4. In fact, the particular configuration of the tongues 22, which can in particular have the same width b1 as the perforations 21, which have an identical width b2 (i.e. where b1=b2), makes it possible to have so-called "cutless punching" or "cutless nibbling". In this way, several intermediate products as shown in FIG. 5a can be machined out of a large (not shown) sheet metal plate without any substantial waste, i.e. essentially no residual material, as what is removed to form a perforation 21 in the first intermediate product can provide a tongue 22 of an adjacent intermediate product machined out of the same sheet metal plate.

Thus, the same width of tongue and perforation enables (essentially) waste-free working.

Alternatively to the design of the perforations 21 shown in FIG. 5a, it is of course also possible to provide completely different types of perforations in the sheet metal plate 27; for example, perforations such as those shown in FIG. 3 for the holding cassette marked 19 or other perforations. In this sense, FIG. 9 shows perforations 21' machined out of the sheet metal plate 27, which can also be described as edge recesses, as they are only provided in the side sections 23 and 24 of the blank (and not in the central section 25).

However, these are not edge recesses open to the outside, but rather recesses in the edge region. FIG. 9 is only intended to illustrate that the perforations 21, 21' do not have to be open to the outside, but can alternatively be completely surrounded by the sheet metal material.

All of the embodiments in FIGS. 1 to 8 can of course also be achieved with perforations 21' as shown in FIG. 9 (or others) and shall be deemed disclosed in connection therewith.

Referring back to FIG. 5a, it should also be noted that the perforations 21 are obviously not evenly distributed over the entire surface 30 of the heat-conducting plate 14 or the blank, but are arranged, for example, only in the edge region, i.e. in the region of the side sections 23 and 24. Thus, it also results in particular that the side sections 23, 24 have more perforations (seven each in the exemplary embodiment according to FIG. 5a) than the central section 25 (no perforations).

Figure 6A:
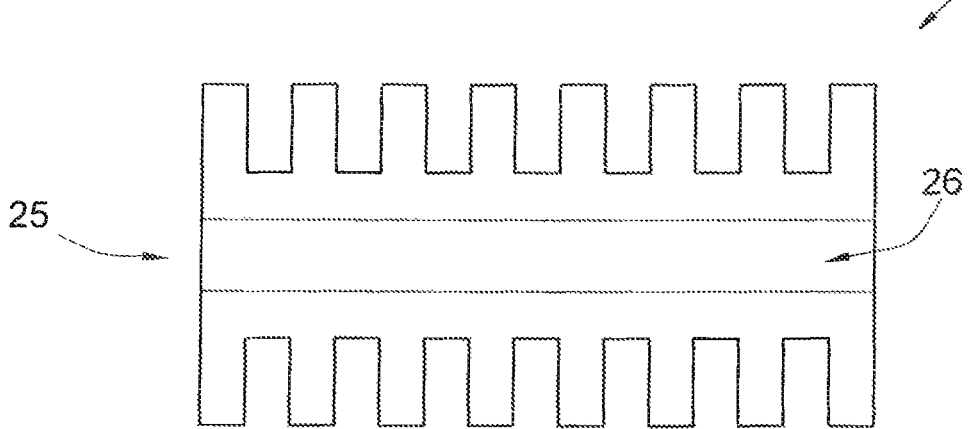
FIG. 6b shows a view according to FIG. 5b of the blank shown in FIG. 5b after carrying out an embossing process to insert a bead.
FIG. 6c shows a view according to FIG. 6b of an alternative, slightly modified heat-conducting plate with pre-tensioned side regions.

FIG. 6a shows the result of a next method step, in a view according to FIG. 5a, wherein the intermediate product now differs in that a bead 26 has been worked, in particular embossed, into the central section 25.

Figure 6B:
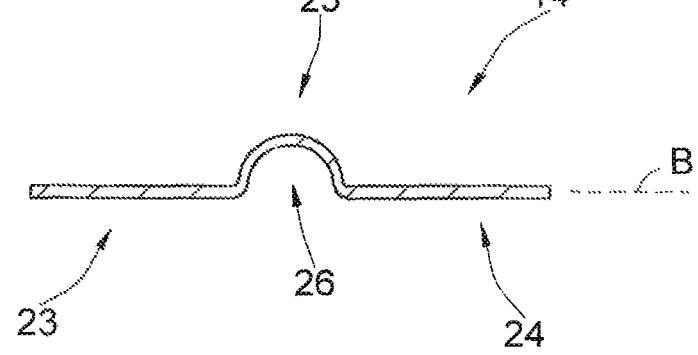

This is illustrated in the cross-sectional view according to FIG. 6b.

Figure 6C:
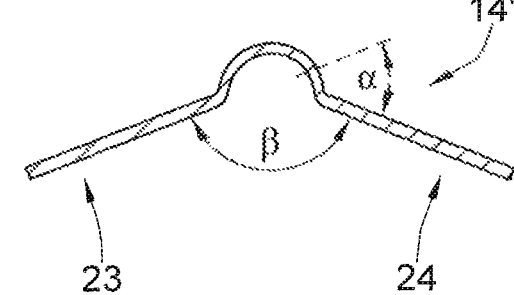

The cross-sectional view according to FIG. 6c then shows an alternative, optional design of the heat-conducting plate, which, for the sake of simplicity, is designated 14'. This is where another optional processing step takes place; thus, the two side sections 23, 24 are brought or formed out of the sheet metal plane, downwards with respect to the open bead 26.

This shaping of the side sections 23, 24 causes them to be at an incidence angle α to one another (in the exemplary embodiment according to FIG. 6b, however, they lie together in the sheet metal plane B, so that no incidence angle arises).

In other words, the side sections 23, 24 form an angle β between them that is smaller than 180° (in the version according to FIG. 6b, however, the angle β is exactly) 180°.

This optional design with the set side sections 23 and 24 causes a certain bias of the heat conducting plate 14' against the holding surface during subsequent attachment to a holding surface, as shown in FIGS. 1 and 3, which can lead to particularly good heat transfer, if necessary, as the tongues 22 or the side sections 23, 24 in particular rest securely against the holding surface.

Figure 7A:
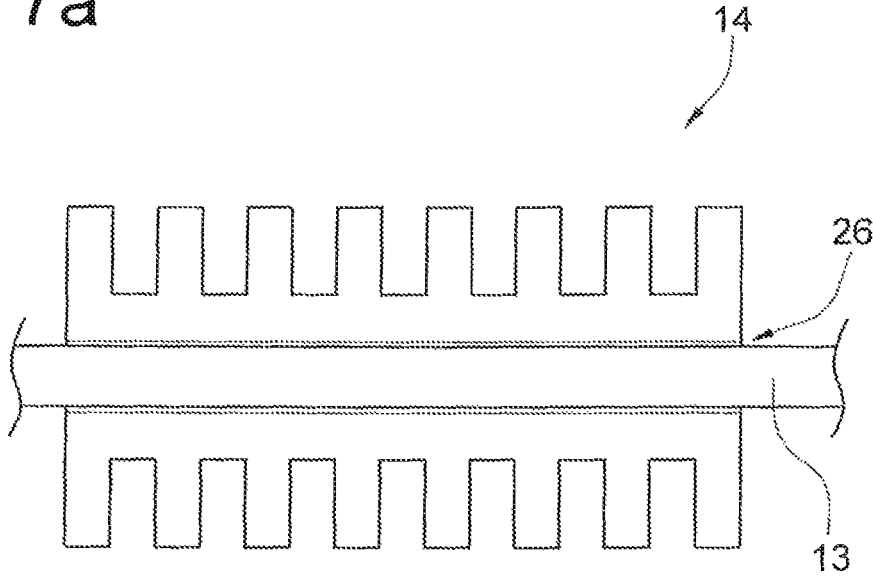
FIG. 7a shows a view according to FIG. 6a of the heat-conducting plate according to the invention according to FIG. 6a with the pipe section inserted into the bead.

Even though the heat-conducting plates in FIGS. 1 and 3 are mostly designated with the reference numeral 14 (and not 14'), the drawings should be understood as optionally showing heat-conducting plates 14', in particular as it is not possible to tell from the drawing alone whether it is a matter of a heat-conducting plate 14 or 14' (this also applies to the view of FIG. 6a and the following FIGS. 7a and 8a).

Figure 7B:
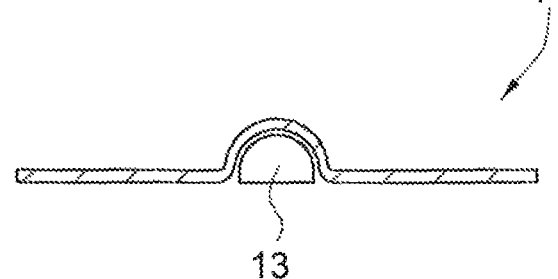
FIG. 7b shows a view according to FIG. 6b of the heat-conducting plate according to the invention according to FIG. 6b with the pipe section inserted into the bead.
Figure 7C:
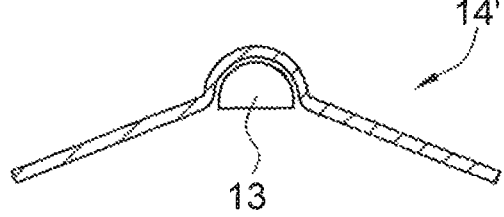
FIG. 7c shows a view according to FIG. 7b of an alternative, slightly modified heat-conducting plate with pre-tensioned side regions.

Here, FIG. 7a shows that in a next method step, a pipe section 13 can be introduced or inserted into the region of the bead 26 of the heat-conducting plate 14. Depending on the embodiment, the pipe section 13 may optionally be clipable into the bead 26 in such a way that it is held (non-detachably) in the heat-conducting plate 14 by the clipping process. Alternatively, the pipe section may merely be loosely inserted into the bead 26, depending on the embodiment. Insertion is also to be disclosed as shown in FIGS. 7b and 7c for both heat-conducting plate configurations 14 and 14'.

In a final method step according to FIG. 8a, holding means can now be attached to the heat-conducting plate 14. In the bottom view according to FIG. 8a, a double-sided adhesive tape 28 has been stuck to the central section 25 of the heat-conducting plate 14 as an example. Ideally, but not necessarily, the adhesive tape 28 is arranged in such a way that it does not cover either the perforations 21 or the tongues 22. However, in the exemplary embodiment, the adhesive tape 28 extends exactly to the beginning of the perforation 21 or tongues 22 and thus covers the entire central section 25, i.e. the section over the width B of which no perforations are arranged.

FIGS. 8*b* and 8*c* also show this tape arrangement for both configurations 14, 14' of the heat-conducting plate.

In order to now move from a configuration according to FIG. 8*a* to an arrangement according to FIG. 1 or 3, the unit shown in FIG. 8*a* can be stuck into a holding cassette 12 or stuck onto a carrier plate 11, for example, while still at the production site.

Alternatively, the unit can first be transported to a (re-mote) assembly location as shown in FIG. 8*a*, to which, for example, the cassette 12 is also delivered. This means that the product can then be stuck in place at the assembly location as shown in FIG. 8*a*.

Further alternatively, a carrier plate 11 with a heat transfer plate and pipe system configuration arranged thereon may be brought to the assembly location to be stuck into the holding cassette.

To attach the heat-conducting plate 14 according to FIG. 8*a* to a corresponding holding surface, a protective layer of the double-sided adhesive tape 28 visible in FIG. 8*a* can be peeled off. For this purpose, a user can, for example, pull a corner 29 of this protective layer and peel it off.

For the sake of completeness, it should be noted that in the present application the heat-conducting plate 14 is referred to as a heat-conducting plate partly with and partly without holding means (here double-sided adhesive tape 28). The holding means can therefore belong to the heat-conducting plate. Typically, however, the pipe system 13 does not belong to the heat-conducting plate. However, as this is covered in particular by the double-sided adhesive tape 28 or the holding means, if applicable, a structural unit is created, which justifies the above explanations.

Finally, with regard to FIGS. 8*a-c*, it should be noted that these represent only one way of applying an adhesive to the heat-conducting plate 14, 14' or the pipe section 13. Instead, an adhesive bead made of a viscous (to liquid) adhesive material could also be applied at the same, similar or comparable points (not shown), which would have the advantage in particular that this adhesive could fill cavities (provided with the reference numeral 31 in FIGS. 8*b* and 8*c*) between the heat-conducting plate 14, 14' and the pipe section 13, which would lead to an improvement in the thermal conductivity of the entire heat exchanger.

In addition, the use of such an adhesive bead or a viscous (to liquid) adhesive would have the advantage that it can enter any (acoustic) fleece that may be present on the holding surface. In this way, on the one hand, thermal conduction properties of the fleece (at an acoustically inac-tive location anyway) can be improved and/or the attach-ment of the fleece to the holding surface can be improved (namely by the additional bonding of the adhesive passing through the fleece).

Figures 10, 12:
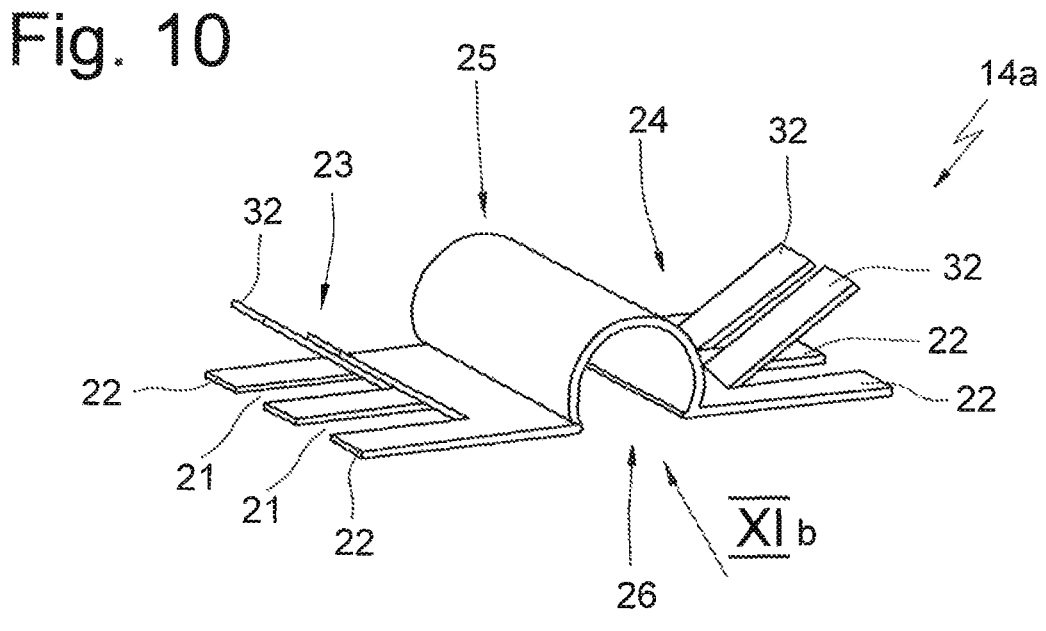
FIG. 10 shows a highly schematic, oblique perspective view of an exemplary section of an alternative, slightly modified heat-conducting plate with raised intermediate tongues.
FIG. 12 shows a view somewhat according to FIG. 11b of an alternative, slightly modified heat-conducting plate with a larger elevation angle of the intermediate tongues, additionally showing or indicating the holding surface.

FIG. 10 then shows a section of the most preferred embodiment of a heat-conducting plate 14*a* according to the invention in a highly schematic oblique view.

This exemplary embodiment corresponds predominantly to the exemplary embodiment according to FIGS. 3 to 8, i.e. it also has a central section 25 with a bead 26 and also, in the region of the side sections 23 and 24, perforations 21, which on the one hand have or form tongues 22 next to them and on the other hand are designed as edge recesses open to the outside.

The big difference between the heat-conducting plate 14*a* and the heat-conducting plates according to FIGS. 1 to 8 is the way in which the perforations 21 are formed here in the manner of open edge recesses.

Thus, FIG. 10 shows that a non-cutting manufacturing method is used in which the perforations 21 are not simply punched out by removing material. Rather, the sheet metal plate is cut laterally to produce them and the resulting intermediate tongues 32 (which have the contour of the perforations 21) are then raised (at an angle), for example bent, folded or similar.

Such a design results in an improvement of the heat exchanger behavior, in particular if it is a system to which air is supplied above the sheet metal plane.

Figure 11A:
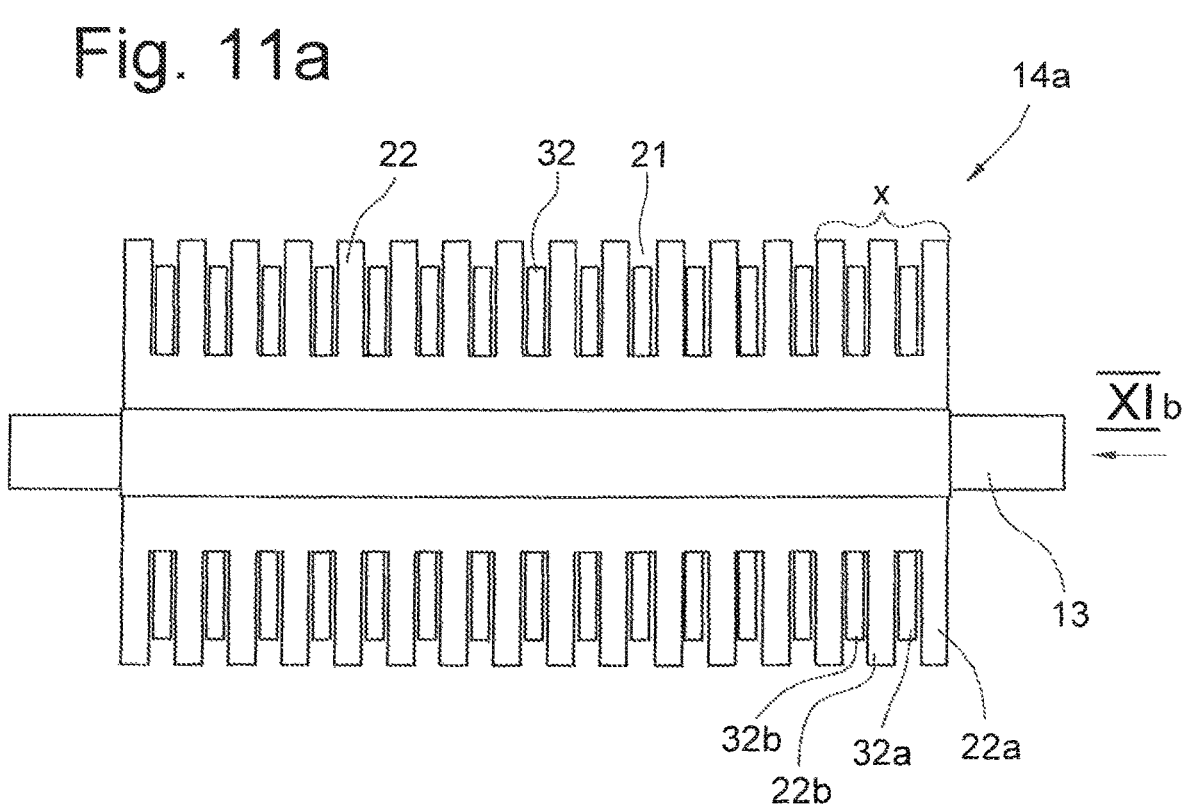
FIG. 11a shows a view according to FIG. 6a of a complete heat-conducting plate according to FIG. 10 with the pipe section inserted into the bead.

FIG. 11*a* then shows a bottom view of the complete heat-conducting plate 14*a* showing the pipe section 13 (whereas FIG. 10 shows only one section, in particular according to a width extension marked X in FIG. 11*a*).

The bottom view according to FIG. 11*a* also shows the alternating arrangement of tongues 22 and (raised) interme-diate tongues 32. By raising the tongues 32 (i.e. with respect to FIG. 11*a*, towards the other side of the plane of the figure, away from the viewer), perforations 21 are created in the manner of lateral edge recesses as shown in FIGS. 1 to 8 (which, of course, are not as clearly visible in FIG. 11*a* as in FIG. 10, for example, due to the view).

In the exemplary embodiment according to FIG. 11*a*, tongues and (raised) intermediate tongues alternate continu-ously. They extend along the entire longitudinal extension of the heat-conducting plate 14*a*.

Figure 11B:
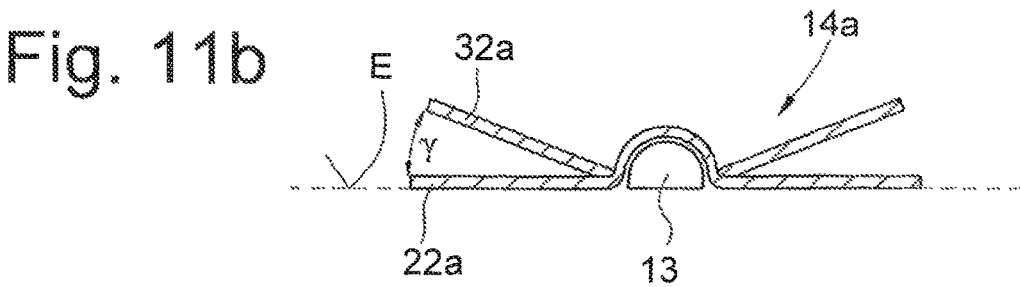
FIG. 11b shows a highly schematic front view of the heat-conducting plate of FIG. 11a in a bottom view together with the pipe section, approximately along view arrow XIb in FIGS. 10 and 11a, FIG. 11c shows a view according to FIG. 11b of an alternative, slightly modified heat-conducting plate with pre-tensioned side regions.

FIG. 11*b* then shows a kind of sectional view, although it is probably more of a frontal view, roughly according to view arrow XIb in FIG. 11*a*. Thus, FIG. 11*b* shows particu-larly well that between the tongue 22*a* and the raised intermediate tongue 32*a* (which of course would not be visible in a pure sectional view), at least in the side view, there is an elevation angle γ. This elevation angle γ is in particular between 1° and 180°, in the present case about 20° as an example.

FIG. 11*b* shows that the heat-conducting plate 14*a* is essentially axially symmetrical, i.e. that a pair of tongues 22 and (raised) intermediate tongues 32 always alternate in the axial direction of the heat-conducting plate 14*a*.

The intermediate tongues 32 of a pair thus preferably have an (axially symmetrically mirrored) identical elevation angle γ.

Figure 11C:
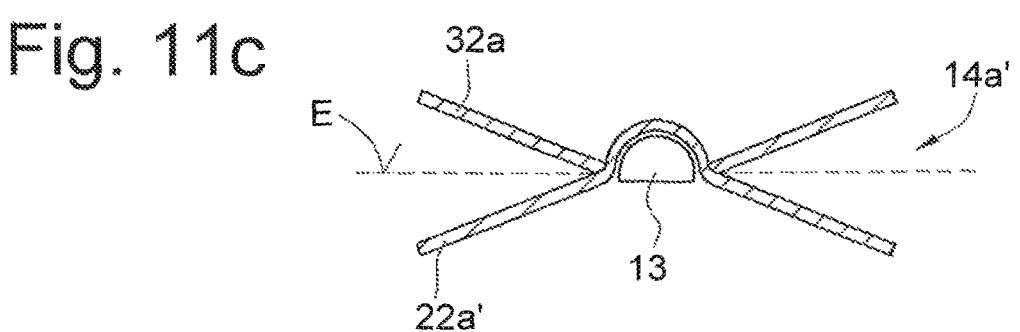

FIG. 11*c* then shows that in this exemplary embodiment, too, the heat-conducting plate 14*a'*, analogous to the exem-plary embodiments according to FIG. 6*c* or 7*c* of the heat-conducting plate 14*a'*, can have inclined side sections 23, 24 or tongues 22, which can cause a certain pre-tensioning of the heat-conducting plate 14*a'* against the holding surface when it is later attached to a holding surface, which can lead to particularly good heat transfer, as a secure and snug attachment of the tongues 22*a'* to the holding surface is made possible.

Finally, it should be pointed out that in FIGS. 11*b* and 11*c* the main extension plane E of the heat-conducting plate is indicated by dashed lines, which is therefore the sheet metal plane from which the heat-conducting plate is typically machined in its blank holder.

Such a holding surface 11 is then shown again as an example in FIG. 12, in which the tongues 22 can either not be pre-tensioned according to FIG. 11*b* or can be pre-tensioned according to FIG. 11*c* (this is typically no longer distinguishable in the later assembly state).

The difference between FIG. 12 and FIG. 11 is essentially that FIG. 11 is intended to illustrate that a substantially larger incidence angle γ of more than 45°, in particular of more than 70°, for example of between 70° and 100° (in the present case of approximately 80° by way of example) can also be selected, wherein such an embodiment is even preferred by the applicant, at least at the time of filing of the present patent application, since corresponding thermal tests were particularly promising.

The invention claimed is:

1. A heat-conducting plate for fixing a pipe section to a holding surface of a heat exchanger, wherein the heat-conducting plate comprises perforations that are formed as outwardly open edge recesses, wherein the heat-conducting plate has intermediate fingers arranged above the edge recesses.

2. The heat-conducting plate according to claim 1, wherein the perforations are configured to absorb sound.

3. The heat-conducting plate according to claim 1, further comprising a central section and at least one side section.

4. The heat-conducting plate according to claim 3, wherein the central section has a bead.

5. The heat-conducting plate according to claim 4, wherein the bead is arranged to cooperate with the pipe section.

6. The heat-conducting plate according to claim 3, wherein the at least one side section bears against the holding surface.

7. The heat-conducting plate according to claim 3, wherein the side section comprises more perforations per surface unit than the central section.

8. The heat-conducting plate according to claim 3, wherein the perforations are substantially formed in the at least one side section.

9. The heat-conducting plate according to claim 8, wherein the perforations are all formed in the at least one side section.

10. The heat-conducting plate according to claim 3, wherein the perforations are arranged inside an enveloping contour of the heat-conducting plate.

11. The heat-conducting plate according to claim 10, wherein the enveloping contour is formed by straight lines.

12. The heat-conducting plate according to claim 1, wherein the outwardly open edge recesses are at an edge of the heat-conducting plate.

13. The heat-conducting plate according to claim 12, wherein a majority of the perforations are formed as outwardly open edge recesses.

14. The heat-conducting plate according to claim 13, wherein all of the perforations are formed as outwardly open edge recesses.

15. The heat-conducting plate according to claim 12, wherein the perforations form tongues in the heat-conducting plate.

16. The heat-conducting plate according to claim 3, wherein the at least one side section includes two side sections that, at least in an unbuilt state, are arranged at an incidence angle to one another, in particular for the purpose of later pre-tensioning on the holding surface.

17. The heat-conducting plate according to claim 1, further comprising holding means for attaching the heat-conducting plate to the holding surface, the holding means being arranged in a region of the heat-conducting plate without perforations.

18. The heat-conducting plate according to claim 17, wherein the holding means is a double-sided adhesive tape.

19. A heat exchanger, comprising: a pipe section; a holding surface; and a heat-conducting plate according to claim 1, wherein the heat-conducting plate fixes the pipe section to the holding surface.

* * * * *